(12) United States Patent
Raisch

(10) Patent No.: US 11,313,445 B2
(45) Date of Patent: Apr. 26, 2022

(54) TRANSMISSION

(71) Applicant: DEERE & COMPANY, Moline, IL (US)

(72) Inventor: Stefan Raisch, Vaihingen/Enz (DE)

(73) Assignee: DEERE & COMPANY, Moline, IL (US)

( * ) Notice: Subject to any disclaimer, the term of this patent is extended or adjusted under 35 U.S.C. 154(b) by 56 days.

(21) Appl. No.: 17/065,801

(22) Filed: Oct. 8, 2020

(65) Prior Publication Data

US 2021/0123510 A1 Apr. 29, 2021

(30) Foreign Application Priority Data

Oct. 23, 2019 (DE) .......................... 102019216303.3

(51) Int. Cl.
*F16H 37/04* (2006.01)

(52) U.S. Cl.
CPC ... *F16H 37/046* (2013.01); *F16H 2200/0078* (2013.01); *F16H 2200/201* (2013.01)

(58) Field of Classification Search
CPC .......... F16H 37/046; F16H 3/006; F16H 3/093
See application file for complete search history.

(56) References Cited

U.S. PATENT DOCUMENTS

| 8,596,157 B2 * | 12/2013 | Vu | ........................ F16H 37/043 74/331 |
| 9,879,761 B2 | 1/2018 | Vu | |
| 10,086,686 B2 * | 10/2018 | Mueller | .................. F16H 3/727 |
| 10,240,668 B2 * | 3/2019 | Raisch | ................... F16H 37/042 |
| 10,352,401 B2 | 7/2019 | Raisch et al. | |
| 10,539,207 B2 * | 1/2020 | Raisch | ................... F16H 37/043 |
| 11,187,310 B2 * | 11/2021 | Eisenhardt | .......... F16H 37/0833 |

FOREIGN PATENT DOCUMENTS

| DE | 10021912 A1 | 11/2001 | |
| DE | 10260179 A1 | 7/2004 | |
| DE | 102013110709 A1 * | 4/2015 | ........... F16H 37/042 |
| DE | 102015211809 A1 | 12/2016 | |
| EP | 0424054 A2 | 4/1991 | |
| EP | 1367296 B1 | 12/2011 | |
| EP | 3109509 A1 * | 12/2016 | ........... F16H 37/042 |

OTHER PUBLICATIONS

European Search Report issued in counterpart application No. 20198060.4 dated Mar. 16, 2021 (15 pages).

* cited by examiner

*Primary Examiner* — Derek D Knight

(57) ABSTRACT

A transmission includes a first and a second shaft, a shift group arranged between the first and the second shafts, and a first and second power path. The shift group has at least two individually shiftable transmission units which differ from one another relative to the gear ratio thereof. A planetary stage is arranged between the shift group and the first shaft, and the planetary stage is configured such that a mechanical power introduced via the first shaft is transmittable to the second shaft via the second power path. At least one transmission unit of the shift group is assigned to each power path, and in at least one shifting state of the shift group, the flow of power runs via at least one respective transmission unit of the first and the second power path. The planetary stage includes at least three planetary units.

20 Claims, 3 Drawing Sheets

| Gear | 45 | 44 | 51a | 52a | 51b | 52b | 51c | 52c | 62 | 63 |
|------|----|----|-----|-----|-----|-----|-----|-----|----|----|
| 1  | X |   | X |   |   |   |   |   | X |   |
| 2  | X | X | X |   |   |   |   |   | X |   |
| 3  |   | X | X | X |   |   |   |   | X |   |
| 4  | X | X |   | X |   |   |   |   | X |   |
| 5  |   | X |   | X | X |   |   |   | X |   |
| 6  | X |   |   | X | X |   |   |   | X |   |
| 7  | X | X |   | X | X | X |   |   | X |   |
| 8  | X |   |   |   | X | X |   |   | X |   |
| 9  |   | X |   |   | X | X |   |   | X |   |
| 10 | X | X |   |   |   | X |   |   | X |   |
| 11 |   | X |   |   |   | X | X |   | X |   |
| 12 | X |   |   |   |   |   | X |   | X |   |
| 13 | X | X |   |   |   |   | X |   | X |   |
| 14 | X | X |   |   |   |   |   |   |   |   |
| 15 | X |   | X | X |   |   |   |   |   | X |
| 16 |   | X | X | X |   |   |   |   |   | X |
| 17 | X | X | X | X | X |   |   |   |   | X |
| 18 |   | X |   | X | X |   |   |   |   | X |
| 19 | X |   |   | X | X | X |   |   |   | X |
| 20 | X | X |   |   | X | X |   |   |   | X |
| 21 | X |   |   |   | X | X |   |   |   | X |
| 22 |   | X |   |   |   | X |   |   |   | X |
| 23 | X | X |   |   |   | X | X |   |   | X |
| 24 |   | X |   |   |   |   | X |   |   | X |
| 25 | X |   |   |   |   |   | X |   |   | X |
| 26 | X | X |   |   |   |   | X |   |   | X |
| 27 | X |   |   |   |   |   | X | X |   | X |
| 28 |   | X |   |   |   |   |   | X |   | X |
| 29 | X | X |   |   |   |   |   | X |   | X |

FIG. 3

TRANSMISSION

RELATED APPLICATIONS

This application claims priority to German Application No. 102019216303.3, filed Oct. 23, 2019, the disclosure of which is hereby expressly incorporated by reference in its entirety.

FIELD OF THE DISCLOSURE

The present disclosure relates to a transmission, and in particular to a transmission having at least one first and one second shaft, wherein at least one shift group is arranged between the first and the second shaft.

BACKGROUND

In larger and heavy-duty utility vehicles such as, for example, tractors, it is important that the transmissions used therein are designed such that a large gear ratio spread is ensured with at the same time a low mass inertia to be synchronized. A large gear ratio spread means that the lower gears have to have a high gear ratio. Moreover, the requirement for a low mass inertia to be synchronized, from a structural perspective in a stress ratio, means the lowest possible speeds of the rotating components of the transmission. For this reason, it is always desirable to increase the number of gears in order to be able to configure the transitions relative to the gear ratio between the individual gears as fluently as possible within the transmission unit. Moreover, the gears are also intended to be shiftable as far as possible under load.

It is already known from the prior art to use planetary stages in order to transmit the mechanical power via two separate power paths from an input shaft to an output shaft. By the simultaneous coupling-in of two power paths which also permit a power transmission in a different gear ratio, a virtually uninterrupted shifting through the gear-ratio spread may be permitted.

Such an arrangement is disclosed, for example, in DE 10 2015 211 809 A1. By an additional power branching within the planetary stage, in particular, an increase in the number of gears may be achieved without additional transmission units being necessary within the shift group arranged downstream.

There is a need, however, to increase the number of gears within the gear ratio spread without a substantial increase in the constructional space being required therefor. Moreover, the individual gears are also intended to be shiftable as far as possible under load.

SUMMARY

According to the present disclosure, the planetary stage has at least three planetary units, wherein each planetary unit consists of at least one sun gear and respectively one planet carrier circulating around the sun gear, wherein the planetary units are exclusively connected together via the planet carriers, and wherein a first and a second planetary unit are configured to be able to be coupled-in or coupled-out via the respective sun gear relative to the first shaft and wherein the third planetary unit provides the power output for the first and the second power path.

Each planetary unit, therefore, has at least one sun gear and one planet carrier, wherein in each case a plurality of planetary gears are connected together in their centre of rotation via the planet carrier according to a conventional design. In this case, depending on the shifting state, the planetary gears may circulate around the respective sun gear, wherein each planetary gear has a rotational speed which may differ from the rotational speed of the planet carrier. In this regard, the differences in diameter between the planetary gears and the sun gear are significant, wherein all of the planetary gears of a planetary unit are configured identically.

In the embodiment, it is possible that mechanical power may be transmitted via two different planetary units from the first shaft on the first or the second power path. In this case, the first and the second planetary unit are configured such that they differ from one another relative to the gear ratio thereof. Within the scope of the present disclosure, for the respective planetary unit the ratio of the diameter of the planetary gears and the diameter of the sun gear circulating around the planetary gears is denoted as the gear ratio. Thus, different shifting states may be implemented according to which planetary unit transmits the mechanical power to the power output of the planetary stage.

In order to bring the first or the second planetary unit into an operative connection with the first shaft, in each case a planetary gear coupling is provided for the first and the second planetary unit, the planetary gear couplings being able to be coupled-in or coupled-out independently of one another, wherein a coupled-in state describes a state in which a power transmission may take place. Accordingly, no power is transmittable in a coupled-out state.

In a further development of the present disclosure, the sun gear of the third planetary unit forms the power output for the first power path and the planet carrier of the third planetary unit forms the power output for the second power path. In this case, the present disclosure makes use of the fact that within a planetary unit two circulating gears may have different speeds as long as no indirect or direct coupling takes place. Accordingly, in an embodiment with a sun gear and a planet carrier, both components may rotate freely relative to one another. This is only possible, however, when at least the planet carrier is set in rotation. According to the present disclosure, it is provided that the individual planetary units are connected together via the respective planet carrier so that the planet carriers of all of the planetary units always have the same rotational speed. The power, however, is always input via the sun gears of the planetary units so that when only one planetary unit is coupled-in only the sun gear is set in rotation but not the planet carrier assigned to the sun gear, wherein any mass inertia or frictional forces are disregarded. So that the planet carrier may also be set in rotation, either both power inputs or both power outputs have to be indirectly or directly coupled together.

According to a first shifting variant, both planetary gear couplings of the first and the second planetary unit may be coupled together to this end, so that both sun gears have the same rotational speed. If both planetary units are configured with a different gear ratio, this also leads at the same time to the planet carrier having the same rotational speed, since— as already mentioned above—the planet carriers of all of the planetary units are connected together. Accordingly, the planet carrier of the third planetary unit also has the same rotational speed as the first shaft at the power output for the second power path. Conversely, the rotational speed of the sun gear substantially depends on how the individual power paths are connected together downstream of the first and the second power output.

According to a second shifting state, both power outputs on the third planetary unit may be coupled together directly or indirectly, wherein however only one of the two planetary gear couplings of the first or the second planetary unit may be coupled so as not to block the transmission. The coupling of the two power outputs in each case takes place by respectively coupling-in a transmission unit in the first power path and a transmission unit in the second power path. If the two planetary gear couplings are coupled-in, only one transmission unit may be coupled-in either in the first or in the second power path.

In another embodiment of the present disclosure, the transmission units of the first and the second power path are respectively arranged on a first and a second outer shaft portion which coaxially surround the first shaft and are not directly connected together. Accordingly, the transmission units of the first power path are arranged on a first outer shaft portion and the transmission units of the second power path are arranged on a second outer shaft portion. Such outer shaft portions have the advantage that, on the one hand, they may be configured to be unconnected to the first shaft so that a relative rotation is possible between the individual outer shaft portions and the first shaft. On the other hand, a space-saving construction may also be provided by such outer shaft portions since a coaxial arrangement requires significantly less constructional space than, for example, an arrangement adjacent to one another.

Due to the variable gear ratio of the transmission units in the first and in the second power path, while a simultaneous coupling-in leads to a power transmission to the second shaft, different rotational speeds may not be produced within the second shaft. Accordingly, a simultaneous connection is only possible when there is no direct or indirect coupling between the two power outputs since such a coupling might forcibly result in the same rotational speed for both outer shaft portions. It is also clear therefrom that a simultaneous connection of both power paths is only possible when only one of the planetary units is coupled-in.

The outer shaft portions may also be configured such that one of the outer shaft portions directly encloses the first shaft and the respective other outer shaft portion encloses both the first shaft and the other outer shaft portion. Naturally, both outer shaft portions may also be arranged independently of one another and adjacent to one another on the first shaft.

According to a development of the present disclosure, the planetary gear couplings are configured as a multiplate clutch, respectively with an inner plate carrier and an outer plate carrier, wherein the outer plate carriers are connected to the sun gears of the first and second planetary stage and in a coupled-in state the inner plate carriers are connected to the first shaft. It is also advantageous if each transmission unit of the at least one shift group is respectively assigned a coupling which is also configured as a multiplate clutch and via which the transmission units may be coupled-in or coupled-out.

The transmission units are at least partially configured as gearwheel pairs or as a direct coupling. In the case of a gearwheel pair, different gear ratios may be implemented, wherein the gear ratio of such a gearwheel pair results from the difference in diameter of the individual gearwheels to one another. Within the scope of the present disclosure the gearwheels of these gearwheel pairs are also denoted as the drive gearwheel and as driven units, wherein a torque is transmitted from the drive gearwheel to the driven units. With a direct coupling the two shafts are coupled directly together so that, as a result, the gear ratio adopts a value of i=1, wherein the value i represents the gear ratio and results from the ratio of the speed of the drive shaft to the speed of the driven shaft. A gear ratio of i=1 may naturally also be implemented with a gearwheel pair, wherein the drive gearwheel and the driven gearwheel then have the same diameter.

In a further development, at least two transmission units are arranged in each power path, so that accordingly a mechanical power may be transmitted from the first shaft to the second shaft via four transmission units. At the same time combinations of connections are produced in which in each case one of the transmission units from the first power path and one of the transmission units from the second power path are simultaneously coupled together, so that a specific number of intermediate gears may be implemented. The number of intermediate gears may be increased by more transmission units being provided in each power path, for example two, three, four or more transmission units, instead of just two transmission units.

Moreover, a second shift group may also be arranged downstream of the shift group, wherein the second shift group also has at least two transmission units which may be configured in a similar manner to the transmission units of the first shift group and which differ from one another regarding the gear ratio thereof. In the case of two transmission units in the second shift group, at least a duplication of the number of gears may be achieved.

According to another embodiment, a couplable reversing unit, which in a coupled-in state effects a reversal of the rotational direction of an output shaft, is also provided. This output shaft may be the second shaft, for example, wherein, however, when incorporating a second shift group further shafts may also be provided, wherein one of the additional shafts then represents the output shaft of the transmission. Finally, by the reversing unit it is achieved that all of the shafts arranged downstream of the reversing unit in the coupled-in state of the reversing unit are subjected to a reversal of the rotational direction. Such a reversal is generally effected by a combination of three gearwheels.

According to a development of the present disclosure, the individual gears of the at least one shifting unit are configured as winding gears, wherein in such a winding gear the driven units, for example, the drive gearwheels respectively of a transmission unit in the first power path and a transmission unit in the second power path, are arranged on a common outer shaft portion which coaxially encloses the second shaft.

A further subject of the present disclosure is the use of a transmission according to the present disclosure in an agricultural machine, in particular a tractor, as well as a method for operating the transmission.

In the method, the shifting states of the at least one shift group are passed through such that alternately either only one of the transmission units of the first power path is coupled-in, or respectively one of the transmission units in the first and at least in the second power path are coupled-in.

According to a development of the present disclosure, when the first and the second power path are connected together, only one of the planetary gear couplings is coupled-in. Alternatively, when only one of the two power paths is connected, both planetary gear couplings are coupled-in.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein:

FIG. 3 shows a shift matrix for the forward operation of the transmission of FIG. 2.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
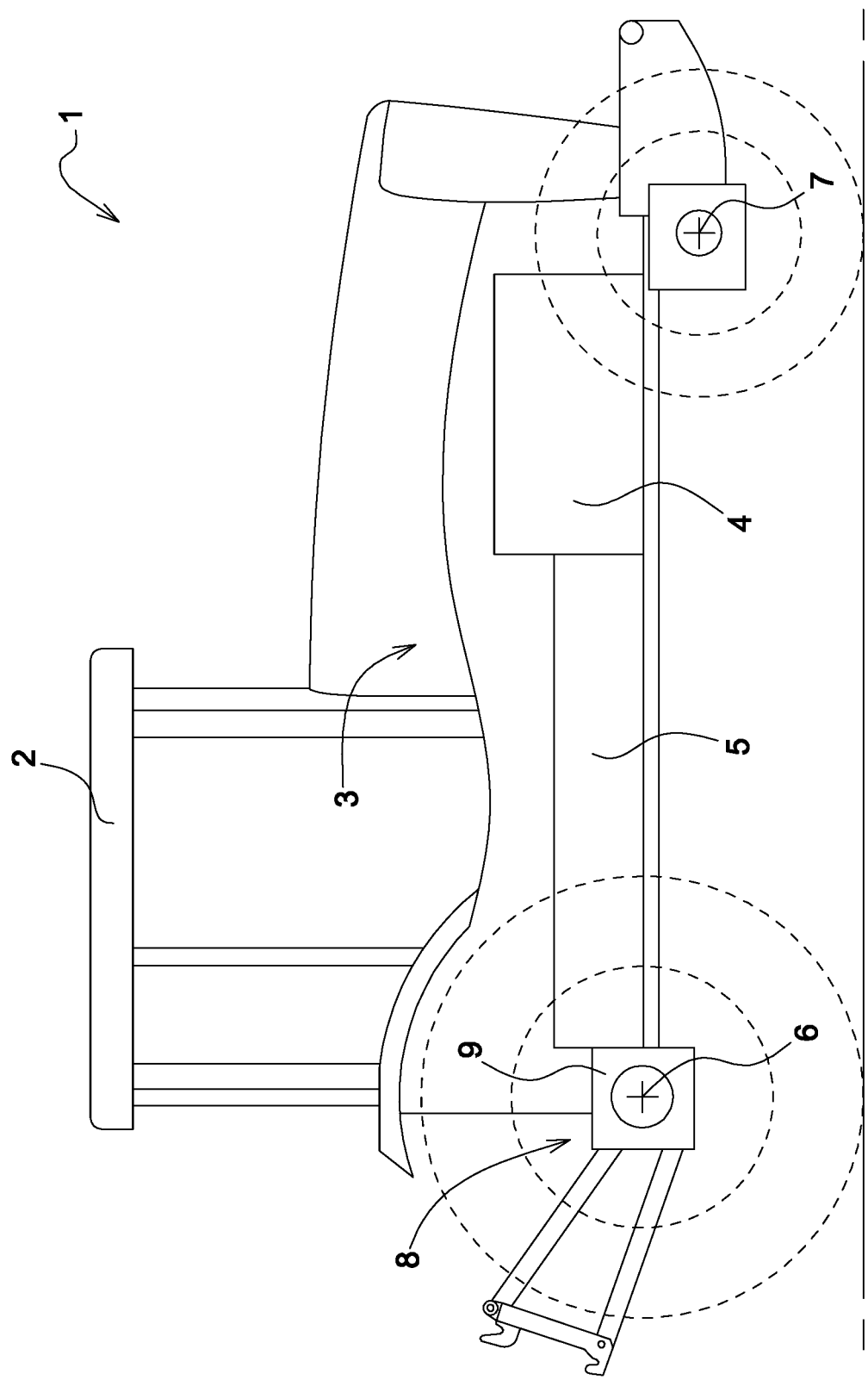
FIG. 1 shows an agricultural machine with a drive train which comprises the transmission according to the present disclosure.
Figure 2:
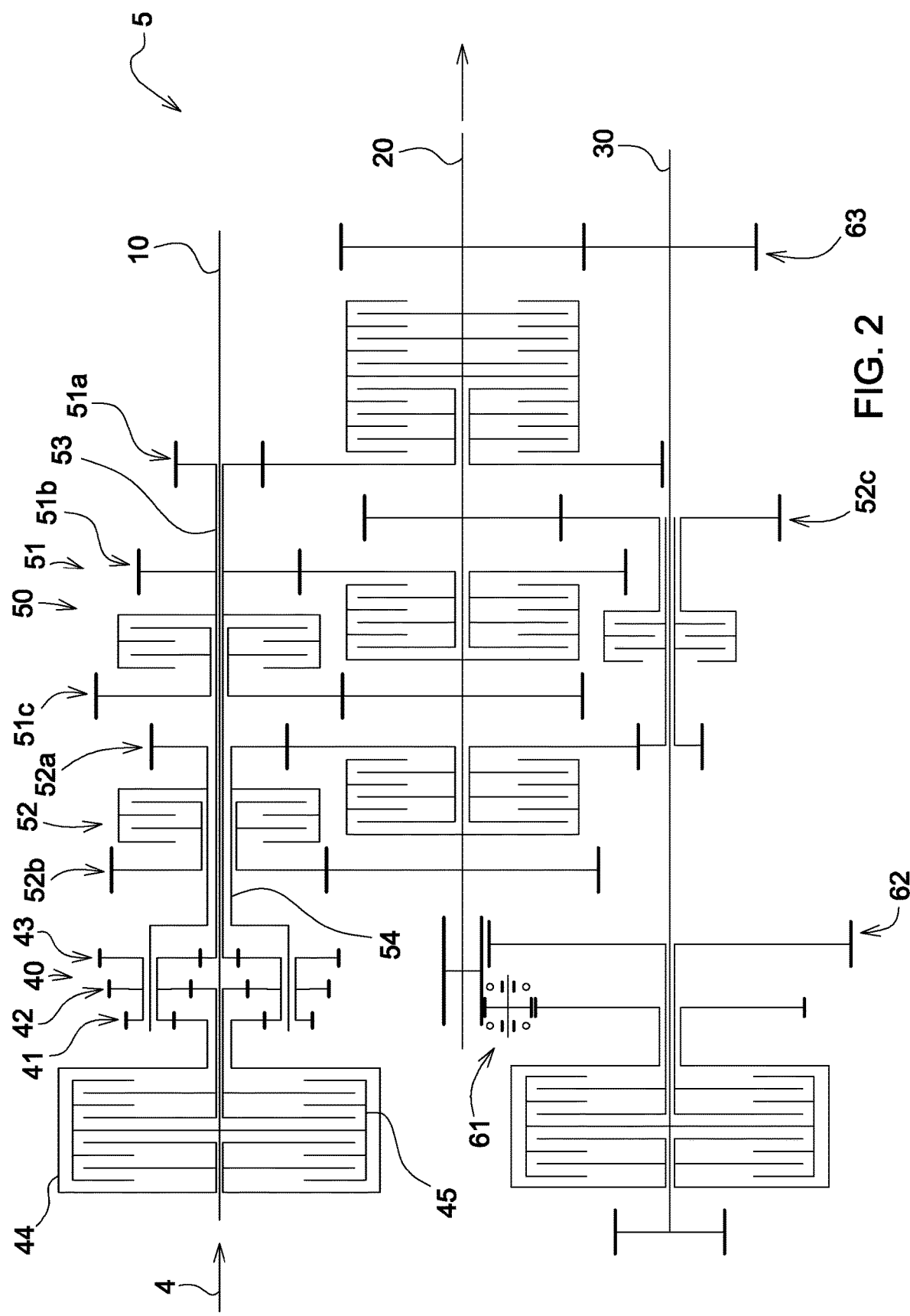
FIG. 2 shows a schematic of a transmission.

FIG. 1 shows an agricultural machine 1 in the form of a tractor with a cab 2 and a drive train 3, wherein the drive train 3 comprises a drive motor 4 and a transmission 5. The drive motor 4 is designed as an internal combustion engine. Moreover, a traction drive 8, which has an axle drive 9 and a permanently driven rear vehicle axle 6, is provided. Additionally, the traction drive 8 comprises a front vehicle axle 7 which is driven as required. The transmission 5 according to the present disclosure is shown in FIG. 2.

The transmission 5 has a first and a second shaft 10, 20, wherein a shift group 50 is arranged between the first shaft 10 and the second shaft 20. The shift group has six transmission units 51a, 51b, 51c, 52a, 52b, 52c which may be individually engaged and which differ from one another relative to the gear ratio thereof. Each of the individual transmission units 51a, 51b, 51c, 52a, 52b, 52c is assigned a separate multiplate clutch so that they may be individually coupled-in or coupled-out. The transmission units 51a, 51b, 51c, 52a, 52b, 52c are also configured as gearwheel pairs, wherein a mechanical power is transmitted from the first shaft 10 to the second shaft 20 via drive gearwheels. For this reason, the drive gearwheels are arranged on the first shaft 10 and the drive gearwheels are arranged on the second shaft 20. A particularity in this connection is represented by the transmission unit 52c since initially a torque is transmitted to a third shaft 30 by the interposition of the transmission unit 52a, and only from there transmitted back to the second shaft 20.

The individual transmission units 51a, 51b, 51c, 52a, 52b, 52c, however, are not directly arranged on the first shaft 10 but instead on outer shaft portions 53, 54, wherein the outer shaft portions 53, 54 coaxially surround the first shaft 10 and thus are configured to be rotatable relative to one another and also to the first shaft 10. In this case the transmission units 51a, 51b, 51c are arranged on a first outer shaft portion 53 and the transmission units 52a, 52b, 52c are arranged on the second outer shaft portion 54. Thus, via the outer shaft portions 53, 54 two independent transmission groups, which in each case are assigned a first and a second power path, are formed. These two power paths are operated via a planetary stage 40, wherein this planetary stage 40 is also arranged on the first shaft 10. The particularity of this planetary stage 40 is that it consists of three planetary units 41, 42, 43, wherein the first and the second planetary unit 41, 42 serves as the power input and the third planetary unit 43 serves as the power output. Each planetary unit 41, 42, 43 in each case consists of a sun gear and a planet carrier with a plurality of planetary gears circulating around the sun gear. The planet carriers of the planetary units 41, 42, 43 are connected together and are also connected to the second outer shaft portion 54 and thus to the transmission units 52a, 52b, 52c. The sun gear of the third planetary unit 43, however, is connected to the first outer shaft portion 53 and thus to the transmission units 51a, 51b, 51c.

The power is input via the sun gears of the first and the second planetary unit 41, 42, wherein the first planetary unit 41 is assigned a planetary gear coupling 44 and the second planetary unit 42 is assigned a planetary gear coupling 45, and wherein the planetary gear couplings 44, 45 are configured as a multiplate clutch, via which the sun gears of the planetary unit 41, 42 may be coupled to the first shaft 10.

If both planetary gear couplings 44, 45 are actuated, the sun gears of the first and the second planetary stage 41, 42 have the same rotational speed, wherein the sun gears differ from one another relative to their diameter. Since the planet carriers are connected together, this has the result that both the planet carriers and the sun gears of the first and the second planetary unit 41, 42 have the same rotational speed, wherein this rotational speed also corresponds to that of the planet carrier of the third planetary unit 43. In the case of such a simultaneous connection of the planetary gear couplings 44, 45 either one of the transmission units 51a, 51b, 51c of the first power path or one of the transmission units 52a, 52b, 52c of the second power path may be coupled-in, so that it is only possible to transmit the mechanical power to the second shaft 20 via one power path.

However, there is also the possibility of distributing power to both power paths, wherein only one of the planetary gear couplings 44, 45 is shifted and then one of the transmission units 51a, 51b, 51c from the first power path and one of the transmission units 52a, 52b, 52c from the second power path are respectively coupled-in.

Thus, in spite of a relatively small number of transmission units 51a, 51b, 51c, 52a, 52b, 52c, a plurality of possible shifting combinations and thus also a plurality of gears are produced for overcoming the gear ratio spread. An additional increase is achieved by a second shift group consisting of the transmission units 62, 63. Moreover, a reversing unit 61, via which the rotational direction of the second shaft 20 may be reversed, is also provided.

FIG. 3 shows a shift matrix for the transmission 5 according to the present disclosure. In this case it may be clearly identified that, when simultaneously connecting respectively one of the transmission units 51a, 51b, 51c from the first power path and one of the transmission units 52a, 52b, 52c from the second power path, only one of the planetary gear couplings 44, 45 may be closed.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A transmission, comprising:
   a first and a second shaft;
   a shift group arranged between the first and the second shafts, wherein the shift group comprises at least two individually shiftable transmission units which differ from one another relative to the gear ratio thereof;

a first power path and a second power path; and a planetary stage arranged between the shift group and the first shaft, wherein the planetary stage is configured such that a mechanical power introduced via the first shaft is transmittable to the second shaft via the second power path, the second power path being coupled-in or coupled-out;

wherein, at least one transmission unit of the shift group is assigned to each power path;

wherein, in at least one shifting state of the shift group, the flow of power runs via at least one respective transmission unit of the first and the second power path;

wherein, the planetary stage comprises at least three planetary units, where each planetary unit includes at least one sun gear and respectively one planet carrier circulating around the sun gear;

wherein, the planetary units are exclusively connected together via the planet carriers;

wherein, a first and a second planetary unit are configured to be coupled-in or coupled-out via the respective sun gear relative to the first shaft; and wherein, the third planetary unit provides the power output for the first and the second power path.

2. The transmission according to claim 1, wherein the sun gear of the third planetary unit forms the power output for the first power path and the planet carrier of the third planetary unit forms the power output for the second power path.

3. The transmission according to claim 1, wherein the first and the second planetary units are operably connected with the first shaft via a planetary gear coupling.

4. The transmission according to claim 3, wherein the respective planetary gear coupling is arranged between the sun gears of the first and second planetary units and the first shaft.

5. The transmission according to claim 1, wherein the transmission units of the first and the second power path are respectively arranged on a first and a second outer shaft portion.

6. The transmission according to claim 5, wherein the first and second outer shaft portion coaxially surround the first shaft and are not directly connected together.

7. The transmission according to claim 1, wherein the planetary gear couplings comprise a multiplate clutch with an inner plate carrier and an outer plate carrier.

8. The transmission according to claim 7, wherein:
the inner plate carriers are connected to the sun gears of the first and second planetary unit; and
in a coupled-in state, the outer plate carriers are connected to the first shaft.

9. The transmission according to claim 1, wherein the transmission units are at least partially configured as gear-wheel pairs or as a direct coupling.

10. The transmission according to claim 1, wherein at least two transmission units are arranged in each power path.

11. The transmission according to claim 1, further comprising a couplable reversing unit operably controlling a reversal of a rotational direction of an output shaft in a coupled-in state.

12. The transmission according to claim 11, wherein the second shaft comprises the output shaft.

13. The transmission according to claim 1, wherein the individual gears of the shift group comprise winding gears.

14. The transmission according to claim 13, wherein a driven unit of one of the transmission units in the first power path and one transmission unit in the second power path are arranged on a common outer shaft portion which coaxially encloses the second shaft.

15. An agricultural machine, comprising:
a drive train comprising a drive motor and a transmission; and
a traction drive comprising an axle drive, a front vehicle axle, and a rear vehicle axle;
wherein, the transmission comprises:
a first and a second shaft;
a shift group arranged between the first and the second shafts, wherein the shift group comprises at least two individually shiftable transmission units which differ from one another relative to the gear ratio thereof;
a first power path and a second power path; and
a planetary stage arranged between the shift group and the first shaft, wherein the planetary stage is configured such that a mechanical power introduced via the first shaft is transmittable to the second shaft via the second power path, the second power path being coupled-in or coupled-out;
wherein, at least one transmission unit of the shift group is assigned to each power path;
wherein, in at least one shifting state of the shift group, the flow of power runs via at least one respective transmission unit of the first and the second power path;
wherein, the planetary stage comprises at least three planetary units, where each planetary unit includes at least one sun gear and respectively one planet carrier circulating around the sun gear;
wherein, the planetary units are exclusively connected together via the planet carriers;
wherein, a first and a second planetary unit are configured to be coupled-in or coupled-out via the respective sun gear relative to the first shaft; and
wherein, the third planetary unit provides the power output for the first and the second power path.

16. The agricultural vehicle according to claim 15, wherein the sun gear of the third planetary unit forms the power output for the first power path and the planet carrier of the third planetary unit forms the power output for the second power path.

17. The agricultural vehicle according to claim 15, wherein the first and the second planetary units are operably connected with the first shaft via a planetary gear coupling.

18. The agricultural vehicle according to claim 17, wherein the respective planetary gear coupling is arranged between the sun gears of the first and second planetary units and the first shaft.

19. The agricultural vehicle according to claim 15, wherein the transmission units of the first and the second power path are respectively arranged on a first and a second outer shaft portion.

20. A transmission, comprising:
a first and a second shaft;
a shift group arranged between the first and the second shafts, wherein the shift group comprises at least two individually shiftable transmission units which differ from one another relative to the gear ratio thereof;
a first power path and a second power path;
a planetary stage arranged between the shift group and the first shaft, wherein the planetary stage is configured such that a mechanical power introduced via the first shaft is transmittable to the second shaft via the second power path, the second power path being coupled-in or coupled-out; and a reversing unit operably controlling a reversal of a rotational direction of an output shaft in a coupled-in state;

wherein, at least one transmission unit of the shift group is assigned to each power path;

wherein, in at least one shifting state of the shift group, the flow of power runs via at least one respective transmission unit of the first and the second power path;

wherein, the planetary stage comprises at least three planetary units, where each planetary unit includes at least one sun gear and respectively one planet carrier circulating around the sun gear;

wherein, the planetary units are exclusively connected together via the planet carriers;

wherein, a first and a second planetary unit are configured to be coupled-in or coupled-out via the respective sun gear relative to the first shaft;

wherein, the third planetary unit provides the power output for the first and the second power path; and wherein, the sun gear of the third planetary unit forms the power output for the first power path and the planet carrier of the third planetary unit forms the power output for the second power path.

\* \* \* \* \*